T. PLUNKETT.
SAW FRAME.
APPLICATION FILED MAR. 6, 1919.

1,305,159.

Patented May 27, 1919.

WITNESSES

INVENTOR
Thomas Plunkett
BY
ATTORNEYS

UNITED STATES PATENT OFFICE.

THOMAS PLUNKETT, OF WESTERLY, RHODE ISLAND.

SAW-FRAME.

1,305,159. Specification of Letters Patent. Patented May 27, 1919.

Application filed March 6, 1919. Serial No. 280,896.

*To all whom it may concern:*

Be it known that I, THOMAS PLUNKETT, a citizen of the United States, and a resident of Westerly, in the county of Washington and State of Rhode Island, have invented a new and Improved Saw-Frame, of which the following is a description.

My invention while capable of embodiment in various saws is particularly advantageous when embodied in hack saws.

The invention has for its general object to provide improved means whereby a plurality of cuts may be made at various distances apart and the adjustments for effecting the various cuts being adapted to be made with facility.

The invention has for a further object to provide in a saw of the indicated character, a frame of simple form involving few parts and providing a strong and durable construction.

Reference is to be had to the accompanying drawing forming a part of this specification, it being understood that the drawing is merely illustrative of one example of the invention.

Figure 1:
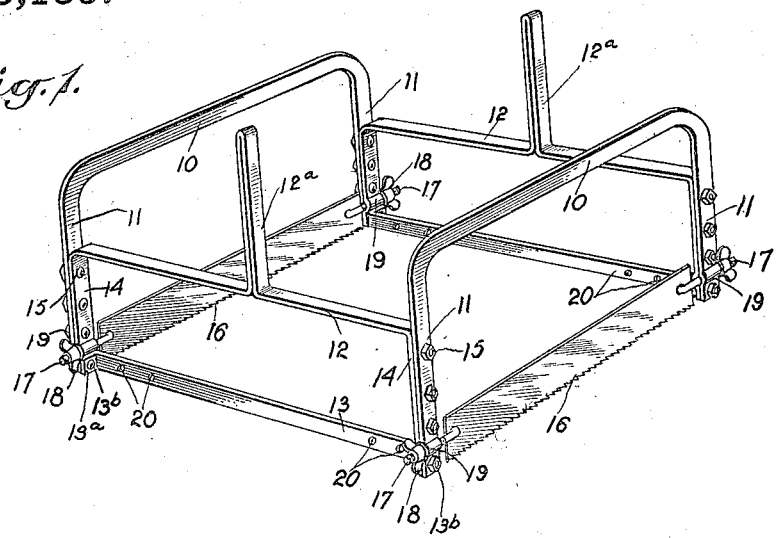
Figure 1 is a perspective view of a plural hack saw embodying my invention.
Figure 2:
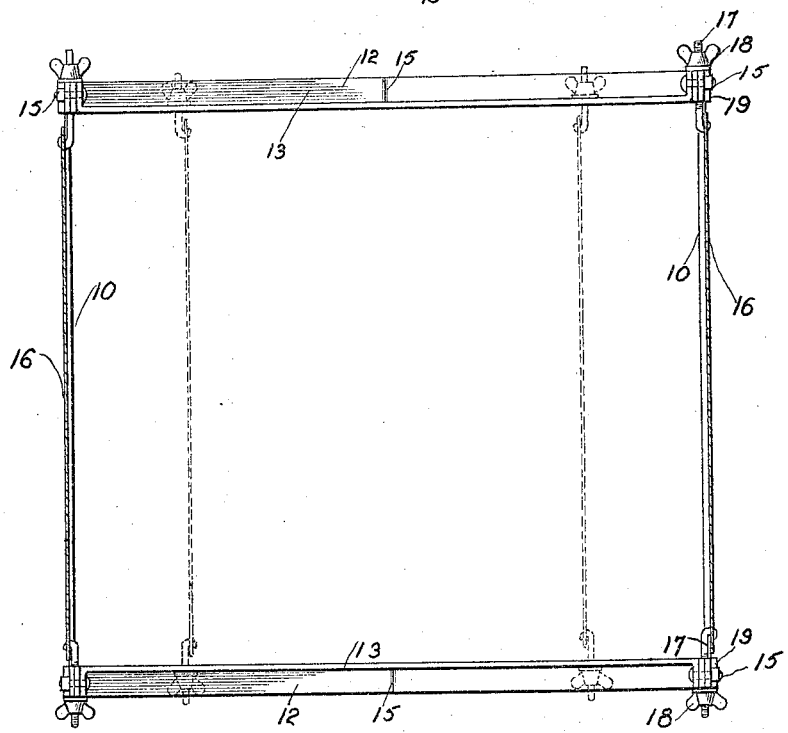
Fig. 2 is a plan view thereof.

In constructing a practical embodiment of the invention as illustrated, two side frames 10 are provided generally of U-shape to present a top bar and depending arms 11. In connection with the said side frames transverse end frames are provided generally of rectangular form comprising top bars 12 each having centrally thereon a handle 12ª produced by bending the material on itself so that the handle upstands above said top bar. Said end frames include also bottom cross bars 13 which are set vertically. The top bar 12 is formed with depending members 14 which lie against the inner surfaces of the depending arms 11 and are rigidly fastened thereto as by bolts or rivets 15. The ends of the bottom cross bar 13 are formed with outwardly directed flanges 13ª fastened by bolts 13ᵇ or the like to the members, 14, and arms 11.

The numeral 16 represents saw blades having perforations in the ends as usual to receive the hooked ends of clamp bolts 17 such as generally employed in hack saws, said bolts having wing nuts 18 thereon. The shanks of the bolts 19 are accommodated in bearings 19 which are presented jointly by the inner surfaces of the arms 11 and members 14, the bolts being thus accommodated between said arms 11 and members 14. With the bolts 17 in the said bearings 19 the blades 16 may be positioned at the extreme sides of the frame, and the bearings, it will be noted, are produced by the members 11 and 14, thereby avoiding the provision of bearings separate from the frame members. In addition to positioning the saws 16 at the outside of the frame, I provide for securing the blades in different positions inward from the sides of the frame for which purpose alining holes 20 are formed in the bottom cross bars 13 of the end frames adapted to receive the bolts 17.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. A saw of the class described including U-shaped side frames presenting top bars and each having depending arms at the ends, rectangular end frames between the side arms, said end frames presenting top and bottom bars and upright members integral with the top bars, the bottom bars of the end frames being set edgewise vertically, hooks adapted to engage saw blades, and bearings for said hooks, said bearings being formed jointly by the arms of the side frames and the upright members of the end frames so that the hooks are accommodated between said arms and upright members, said hooks having tensioning nuts thereon.

2. A saw structure including side frames of U-shape presenting depending arms, rectangular end frames between said side frames and rigidly fastened thereto, said end frames having top bars provided with handles centrally thereon, and presenting bottom cross bars, tensioning hooks adapted to secure and tension a plurality of saw blades, and means to support said tensioning hooks in various positions transversely of the structure.

THOMAS PLUNKETT.

Copies of this patent may be obtained for five cents each, by addressing the "Commissioner of Patents, Washington, D. C."